United States Patent [19]
Slater
[11] 3,914,540
[45] Oct. 21, 1975

[54] OPTICAL NODE CORRECTING CIRCUIT

[75] Inventor: Dan Slater, Fullerton, Calif.
[73] Assignee: Magicam Inc., Santa Monica, Calif.

[22] Filed: Oct. 3, 1974
[21] Appl. No.: 511,742

[52] U.S. Cl. .................. 178/6.8; 352/53
[51] Int. Cl.[2] .................. G03B 41/00; H04N 5/24
[58] Field of Search .................. 178/6.8, 7.81, DIG. 1, 178/DIG. 6, DIG. 35; 352/48, 53, 88

[56] References Cited

UNITED STATES PATENTS

| | | | |
|---|---|---|---|
| 2,968,211 | 1/1961 | Douglas | 352/53 |
| 3,420,953 | 1/1969 | Wolff | 178/DIG. 6 |
| 3,437,748 | 4/1969 | Latady | 178/DIG. 1 |
| 3,586,428 | 6/1971 | Matalou | 178/DIG. 6 |
| 3,749,822 | 7/1973 | Van der Veer | 178/DIG. 6 |
| 3,862,358 | 1/1975 | Wolff | 178/DIG. 35 |

*Primary Examiner*—Howard W. Britton
*Attorney, Agent, or Firm*—Lindenberg, Freilich, Wasserman, Rosen & Fernandez

[57] ABSTRACT

In a composite photography system of the type wherein a foreground camera photographs a normal dimensioned live actor while a background camera photographs scenery whose size is on a different scale in such a manner so that when the outputs from both cameras are superimposed the actor will appear to be performing in front of the scenery filmed by the background camera, it is necessary to slave the motion of the background camera to the motion of the foreground camera. With conventional type camera supports, the foreground camera's pivotal motions invariably take place about a pivotal axis which is spaced from the nodal point of the camera lens. In order to avoid distortion in the superimposed scenes as the background camera pivots to follow the pivotal motion of the foreground camera, compensation for the displacement of the foreground and background camera pivotal points from their nodal points must be provided to the background camera. Heretofore this has been done mechanically. This invention provides a method and means of electrical compensation instead of mechanical compensation for this displacement.

6 Claims, 11 Drawing Figures

OPTICAL NODE CORRECTING CIRCUIT

BACKGROUND OF THE INVENTION

This invention relates to composite photography systems of the type using two cameras, and more particularly to improvements therein.

In an application by Trumbull, et al, entitled Composite Photography System, which was filed on Mar. 15, 1974, and bears Ser. No. 451,590, there is described and claimed a two camera composite photography system in which the foreground camera photographs a live actor or live action in front of a background whose color is selected so that no signal is generated by the foreground camera in response to the light received therefrom. A background camera is mounted and driven in a manner to follow the motion of the foreground camera as the foreground camera follows the action in front of it. However, since the background camera is photographing for example, a miniature background set, its motions, in response to those of the foreground camera, are reduced proportionally. The outputs from the two cameras are superimposed to produce a composite photograph. Th major problem in systems of this sort comprises the maintenance of the rgistration of the movements of the two cameras in order to provide accuracy in the illusion being provided by the composite photography system. The required degree of accuracy depends upon the intended use of the finished composite picture. Wide screen motion picture projection, for example, requires much more accurate registration than say, commercial television.

In preserving the accuracy of the illusion, it is essential that the perspectives with which the foreground and background cameras view their respective scenes remain equal to each other during camera movement. In the typical mounting of the pivotal operation of the foreground camera, its pivotal point is not located at the effective optical center or nodal point of the lens of the camera as the image being viewed enters the optical system of the camera, but rather is located displaced substantially rearwardly and downwardly of the nodal point. As a result of the pivotal point displacement from the nodal point, pan or tilt movement of the foreground camera causes its nodal point to describe an arc of a radius which may be substantial, depending on the camera used. Consequently, the perspective with which the foreground camera views its scene changes during pan or tilt.

If a synchronously coupled foreground and background camera, identical to one another, and identically mounted, view scenes on the same scale of size, then no correction from nodal point displacement whoud be needed—the perspectives with which the cameras would view their perspective scenes would remain synchronized even in pan and tilt. However, in the preferred form, which employs a miniaturized background set, these conditions do not obtain and compensation must accordingly be made for nodal point displacement in order to maintain satisfactory perspective registration during pan and tilt.

In the embodiment of the invention described in the aforementioned patent application, the background camera is mounted on a rack which provides for motion in the X, Y and Z-axes. A periscope tube is provided for viewing the background miniaturized sets. Provision is made in the mechanical mounting of the camera which provides pivotal action, for compensating for the displacement of the pivotal axis of the foreground camera from its nodal point. However, such compensation while substantially effective in view of the fact that the background camera, in looking at miniaturized sets, has its slaving motions reduced, is not 100% effective. The reason for this, is that it would be extremely difficult to provide a mechanical mounting of a type which could be 100% effective to compensate motions of the background camera for the displacements of the pivotal points from the nodal points of both cameras.

OBJECTS AND SUMMARY OF THE INVENTION

It is an object of this invention to provide a means for electrically correcting the end position assumed by a background camera in response to the pan and tilt motion of a foreground camera, where one or both cameras do not pivot about their nodal points.

It is another object of this invention to provide for a more accurate compensation, than heretofore available, in the end position of a background camera in response to pan or tilt motion of a foreground camera where one or both cameras have their pivotal points displaced from their nodal points.

The foregoing and other objects of the invention may be achieved in an arrangement wherein first correctional signals are generated at the background camera, to move it along its X, Y and Z axes in response to pan and tilt signals generated by pan and tilt motion of the foreground camera. These first correctional signals correct for the displacement of the nodal point from the pivotal point of the background camera. Simultaneously therewith, second correctional signals are generated in response to the pan and tilt motion of the foreground camera, based on its nodal to pivotal point displacement. These second correction signals are attenuated by an amount determined by the scales of the background and foreground scenes. These attenuated second correctional signals are combined with the first correction signals and are then applied to the background camera in addition to the usual pan and tilt signals, causing the background camera to be moved to a location at which its nodal point corresponds with reference to the scene it is viewing, to the location of the nodal point of theh foreground camera, with reference to the scene it is viewing. The pan and/or tilt angles for both cameras are the same.

The novel features of the invention are set forth with particularity in the appended claims. The invention will best be understood from the following description when read in conjunction with the accompanying drawings.

DESCRIPTION OF THE PREFERRED EMBODIMENT

Figure 1:
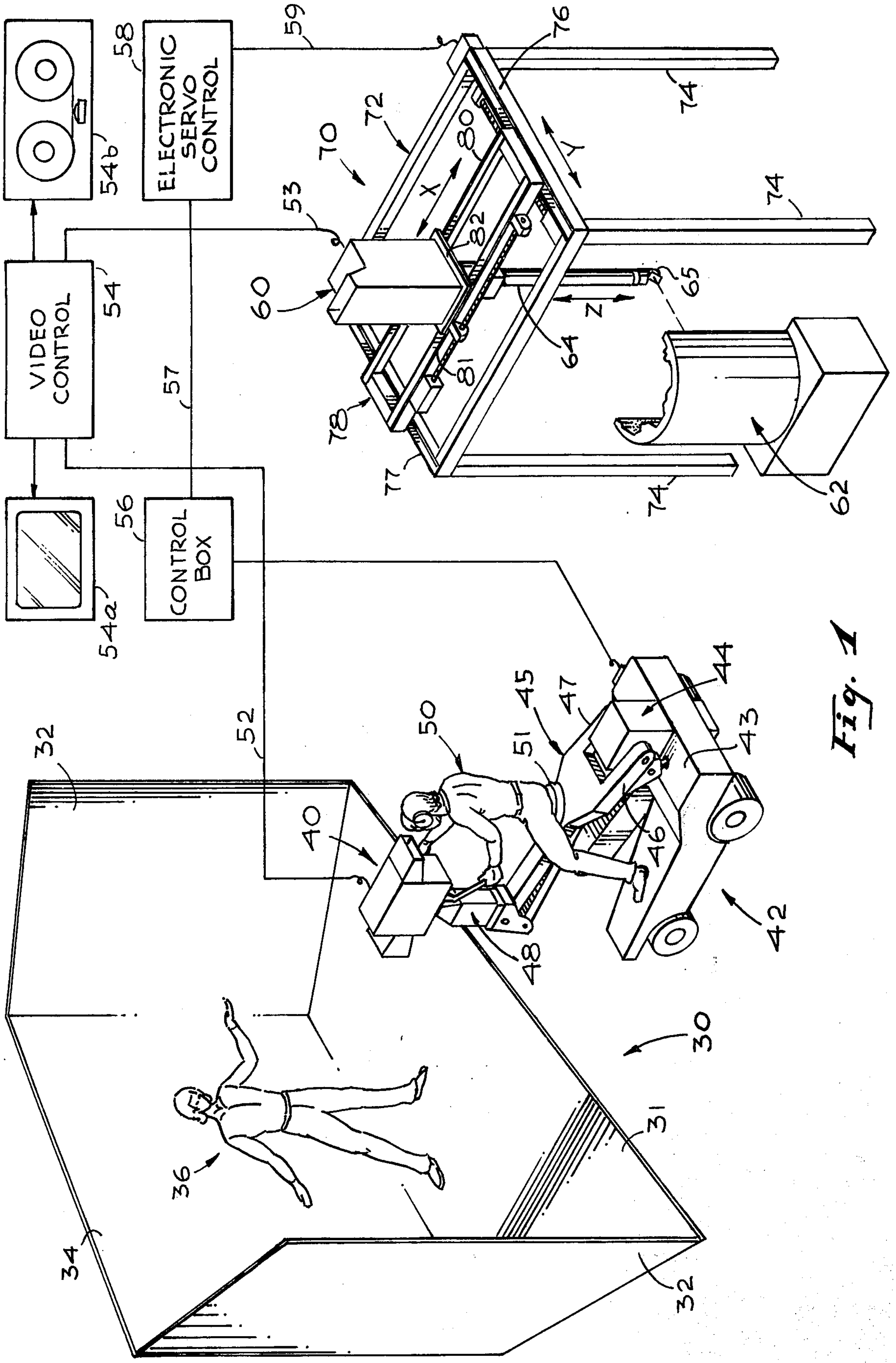
FIG. 1 is a perspective view, partially diagrammatic, of apparatus with which the embodiment of this invention may be employed.

FIG. 1 is the same as FIG. 1 in the Trumbull el al application referred to previously. There is indicated generally a stage 30, including a floor 31, sidewalls 32 and 33 and a rear wall 34. The upper surface of floor 31 and the inner surfaces of walls 32, 33 and 34 are colored or otherwise treated to perform a keying function. Thus, when a blue-screen system is used, then the surfaces just mentioned are colored blue and the viewing camera is insensitive to blue. Standing on the floor 31 is an actor indicated generally at 36, within the field of view of a foreground (FG) camera indicated generally at 40. That camera, here shown as a television camera, is mounted on a dolly, indicated generally, at 42 and provided in tis rear portion with a platform 43, having a stanchion 44 projecting upwardly therefrom. A boom, indicated generally at 45, is bifurcated in its rear portion, providing a pair of legs 46, 47, which are journaled to a stanchion 44, for pivotal rotation about a horizontal axis.

Means are provided on dolly 42 for pivotally moving boom 45 between uppermost and lowermost positions including pantograph means for maintaining the axis of camera support pedestal 48 vertical during such movement. A cameraman, indicated generally at 50, sits on a seat 51 mounted on the upper portion of the boom 45, substantially midway of its length.

The video output of camera 40 is fed through a cable 52 to a video control box, indicated generally at 54. Signals carrying intelligence as to movement of camera 40 horizontally, vertically and in pan and tilt are fed through a cable 55 to a control box, indicated generally at 56, and thence through cable 57 to an electronic servo control box indicated generally at 58.

A background (BG) camera is indicated generally at 60, and means are provided for coupling the movement of FG camera 40 and BG camera 60 in X, Y and Z directions and in pan and tilt. BG camera views a miniature set indicated generally at 62, through a downwardly extending periscopic lens indicated generally at 64 having at its lower end a mirror or prism 65.

A support stand indicated generally at 70 includes an upper rectangular frame indicated generally at 72 supported at its corners by vertical legs 74 resting on the floor. Frame 72 includes a pair of parallel oppositely disposed side legs 76 and 77, and a rectangular dolly frame, indicated generally at 78, is mounted for reciprocal linear movement on lege 76, 77 in the Y direction. Dolly frame 78 itself has a pair of spaced parallel legs 80 and 81 on which a carrier 82 is mounted for transverse movement in the X direction, and which supports BG camera 60.

The video output of BG camera 60 is fed through cable 53 to the video control 54 whose output may be fed to either or both of monitor **54*a* or videotape recorder 54*b*. Signals from electronic servo control 58 are fed through cable 59 to support stand 70, in order to control the movement of camera 60** in X, Y, Z, pan and tilt.

Figure 2:
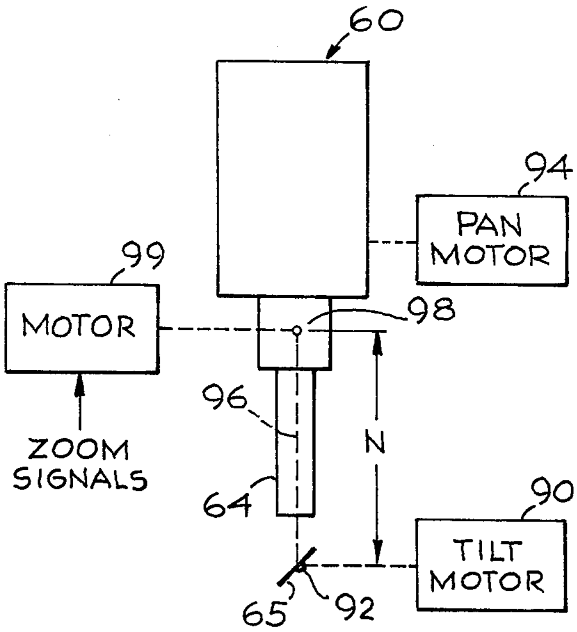
FIG. 2 is a schematic drawing of an illustrative background camera.

FIG. 2 is a schematic view of the BG camera 60. It has a telescopic extension 64 and at the end thereof is the mirror 65. The mirror is driven by a motor 90 to tilt about an axis 92 to provide a tilt response to foreground camera tilt operation. For providing pan response to pan operation of the foreground camera, the camera 60 together with mirror 65 is driven by a motor 94 to rotate about the optical axis which is represented by the dotted line 96 which passes through the nodal point 98 of the camera and through the pivotal point 92 of the mirror 65. The distance between theh pivotal point and the nodal point is desgnated by letter N. For providing zoom response, the lens is moved in response to zoom signals by zoom motor 99.

Figure 3:
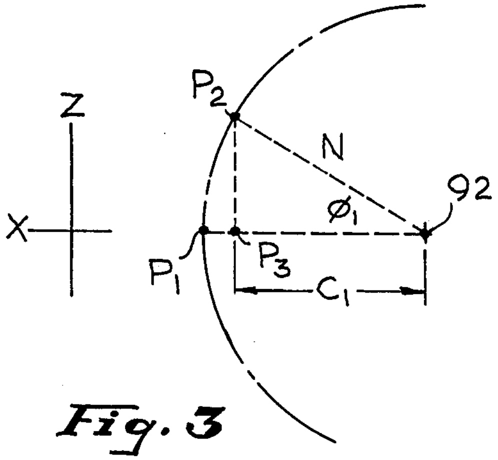
FIGS. 3 and 4 are geometric drawings shown to assist in an understanding of this invention.

The effect of tilting the mirror 65, as far as the camera is concerned, is as if the camera was rotated about the pivotal axis 92. This is represented in FIG. 3, which is a geometrical drawing where the pivotal point 92 is the center of a circle having the radius N. Whenever the mirror 65 moves to provide a tilt response, the nodal point 98 moves on the circumference of a circle whose radius is N. For example, assume that the mirror 65 has been tilted by an angle $\phi 1$ . The nodal point 98 moves from point P1 to point P2.

It should be noted that the tilt operation has the effect of moving the nodal point upward along the Z axis and along the axial direction X so that the perpendicular drop from the point P2 upon a line extending between 92 and P1 intersects the line at the point P3.

It should be noted now that N is the hypotenuse pf a right triangle defined by the points P2, P3 and 92. The distance $C_1$ between P3 and 94 may be defined as N Cos $\phi_1$. The change in altitude or distance Z that the nodal point has been moved to respond to tilt angle $\phi_1$ is N Sin $\phi_1$.

Figure 4:
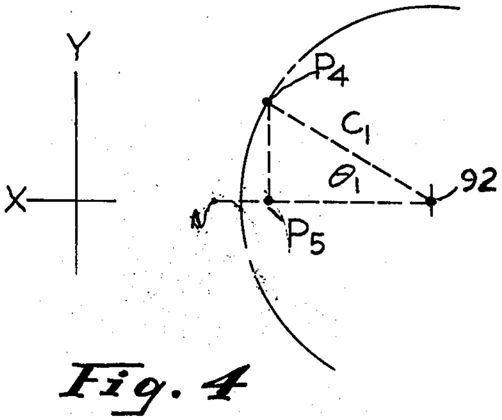

When the BG camera 60 is panned to respond to a pannnign signal from the FG camera, the effect is to rotate the camera about the pivotal point 92. Its nodal point however, will describe a circle whose radius is determined by the displacement along the X-axis caused by the amount of tilt that the BG camera has at the time. As shown in FIG. 4, which illustrates what happens during pan operation, if the BG camera is absolutely horizontal at the time it receives the panning signal, the radius of the circle described by the nodal point equals N. If the BG camera has been tilted at the time that a panning signal is received, then the radius of the circle equals displacement along the X-axis or $C_1$. It was previously pointed out that $C_1$ equals N Cos $\phi_1$. When $\phi_1$ is zero, which is the situation when there is no tilt angle and the camera is horizontal, then Cos $\phi_1$ equals 1 and $C_1$ equals N.

As previously pointed out, the nodal point 98 describes a circle whose radius equals $C_1$. Assuming a pan angle $\theta_1$ the nodal point 98 is moved to a location $P_4$. When a perpendicular is dropped from the point $P_4$ onto the line between 92 and 98, it intersects therewith at a point desingated as $P_5$. The distance along the Y-axis which the nodal point has moved is $C_1 \text{ Sin } \theta_1 = Y$ and the location of the nodal point on the X-axis with the pivotal point 92, as the origin is $X = C_1 \text{ Cos } \theta_1$.

Now, in order to eliminate any error in viewing perspective of the BG camera arising because the pivotal point of the BG camera is displaced from the nodal point, in accordance with this invention, the nodal point of the camera is moved to the pivotal point location of the camera while still maintaining the pan and tilt angles which have been signalled from the FG camera. This is done by adding the displacement of the nodal point, by pan and tilt operation, which, as previously indicated, is claculated as the X, Y and Z displacement of the nodal point from the pivotal point, to any X, Y and Z signals which are received from the goreground camera at the time. However, since there is no reference location for the X and Y signals sent by the FG camera instead of adding these signals to the foreground camera X and Y signals as distance signals, they are added as velocity signals. Thus, the correctional signals required to move the nodal foreground of the background camera to its pivotal point are, rate $X = l/dt\ l\text{Cos } \theta_1$ rate $Y = d/dt\ C_1 \text{ Sin } \theta_1$ $Z = N \text{ Sin } \theta_1$ Z is added as a distance signal, because there is a reference plane for Z which is the reference plane. The effect of any zoom signal is to make the distance N longer or shorter.

Figure 5:
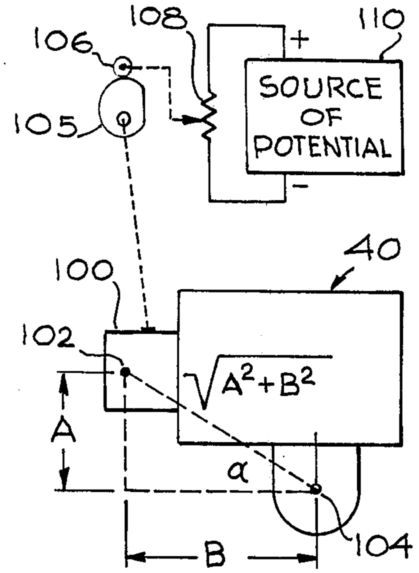
FIG. 5 is a schematic drawing illustrative of a foreground camera.

Now that the BG camera has had its nodal point location corrected, it is necessary to provide correctional signals for the displacement of the forground camera nodal point from the pivotal point of the camera. FIG. 5 is a achematic diagram of the foreground camera 40. The lens extension tube 100 of the camera is designated by the reference numeral 100, and the nodal point is designated by reference numeral 102. The pivotal point of the camera is designated by the reference numeral 104 and the distance between the pivotal point and the nodal point is represented by $A^2 + {}^{B2}$. If the FG camera has a zoom lens, then a mechanical attachment is made between the lens housing and a cam 105 to rotate the cam with motion of the zoom lens. A cam follower 106 moves over the cam surface with rotation of the cam. The cam follower moves the arm of a potentiometer 108. The potentiometer 108 is connected across a positive and negative source of potential 110. When the lens housing is in its normal position, that is, when the lens is neither moved toward the wide angle or telephoto side of normal, the potentiometer arm should provide a zero output signal, otherwise the output signal should go positive as the lens zooms to move the nodal point 182 further away from the camera. The zoom signal should go negative when the zoom lens is moved to bring the nodal point 102 closer to the camera. The actual displacement of the nodal point is not a linear function of the motion of the 200m lens, and that is why the cam and cam follower are used to take care of the nonlinear movement of the nodal point. Information as to nodal point movement with zoom lens movement may either be obtained from the lens manufacturer or measured on an optical bench.

Figure 6:
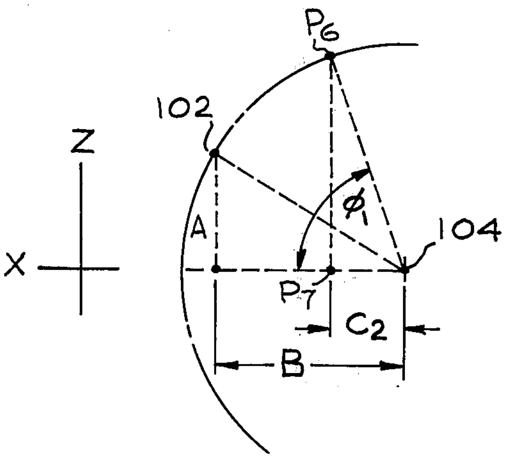
FIGS. 6 and 7 are geometric drawings shown to assist in an understanding of the invention.
Figure 7:
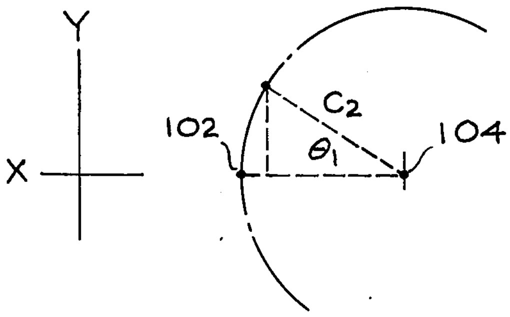

FIGS. 6 and 7 are geometric drawings shown to assist in an understanding of the derivation of correction signals from the FG camera. As seen in FIG. 6, in view of the construction of the FG camera, when the camera is held horizontally the nodal point 102 is at a distance A above the horizontal plane and is at a distance B displaced along the X-axis, from the pivotal point 104. The radius of the circle described by the nodal point when the FG camera is tilted is $A^2 + {}^{B2}$. Because of camera construction, the permanent angle formed at the pivotal point, $\alpha = \text{arc tan } A/B$.

Now, assume that the FG camera has been given a tilt movement so that the nodal point 102 is moved to the point $P_6$. The total tilt angle $\phi_1$ equals arc tan A/B plus the angle of tilt just given to the camera. The value of the distance Z that the point $P_6$ has above the horizontal axis, which is the distance between points P6 and P7, $Z = A^2 + {}^{B2\ Sin}\ \phi^{Sin}\phi_1$. The displacement along the X-axis of point P6 or $C_2 = A^2 + {}^{B2} \text{ Cos } \phi_1$.

The distance $C_2$ is the radius of the circle which will be described by the nodal point when the foreground camera is given a panning motion. This distance $C_2$ can vary from a maximum $A^2 + {}^{B2}$ ), when the FG camera is tilted down so that the distance between the nodal point and the pivotal point is parallel to the ground plane, to a value down to zero when the camera is tilted so that the nodal point is directly over the pivotal point. The effect of zooming the FG camera lens is merely to increase the size of B.

Referring now to FIG. 7, there is shown a geometrical figure representing the motions of the nodal point when the FG camera is panned. Assume, that the FG camera is panned by an angle $\theta_1$. The radius of the circle described by the nodal point, as previously pointed out, is determined by the tilt angle of the camera and is defined by $C_2$. The distance along the Y-axis to which the nodal point is moved, $Y = C_2 \text{ Sin } \theta_1$. The distance along the X-axis of the nodal point from the pivotal point 84, $X = C_2 \text{ Cos } \theta_1$. The X, Y and Z signals, whose derivation has been indicated above, define the location of the nodal point of the FG camera with the pivotal point as the origin.

In pan and tilt operation, in order to compensate the placement of the nodal point of the BG camera for the displacement of the nodal point of the FG camera it is necessary to move the nodal point of the background camera until its location corresponds to that to which the foreground camera has been moved. The virtue of the previously indicated BG camera correction signal, when applied to the BG camera has the effect of positioning the BG camera as if it had been pivoted on its nodal point, and eliminates the error caused by its nodal point being displaced from its pivotal point. Then the application of FG camera correction signals to the BG camera will have the effect of moving the BG camera nodal point to a location corresponding to the location of the nodal point of the FG camera. However, before applying FG camera correctional signals, the X, Y and Z distance representative signals must be attenuated by the scale factor specified by the relative sizes of foreground and background scenes. As before, because there is no reference point or plane for the X and Y signals, these are converted into rate signals by differentiating the values for X and Y. Since there is a reference plane for the Z signals, these may be used in absolute form. Pan, tilt and zoom of the BG camera is the same as for the FG camera.

Accordingly, to summarize what has been described, when the BG camera is to be moved in response to a pan or tilt signal from the FG camera, in order to compensate for displacement of its nodal point from its pivotal point it is moved to position its nodal point at its pivotal point. The BG camera must be additionally moved to locate its nodal point at a point corresponding to the location of the nodal point of the FG camera. These corrective motions are simultaneously accomplished by generating rate X, rate Y and Z correction signals for the FG camera, scaling them properly and generating rate X, rate Y and Z correction signals for the BG camera. These signals are then combined and applied to the BG camera to move it. The pan, tilt and/or zoom signals are also applied to the BG camera.

Figure 8:
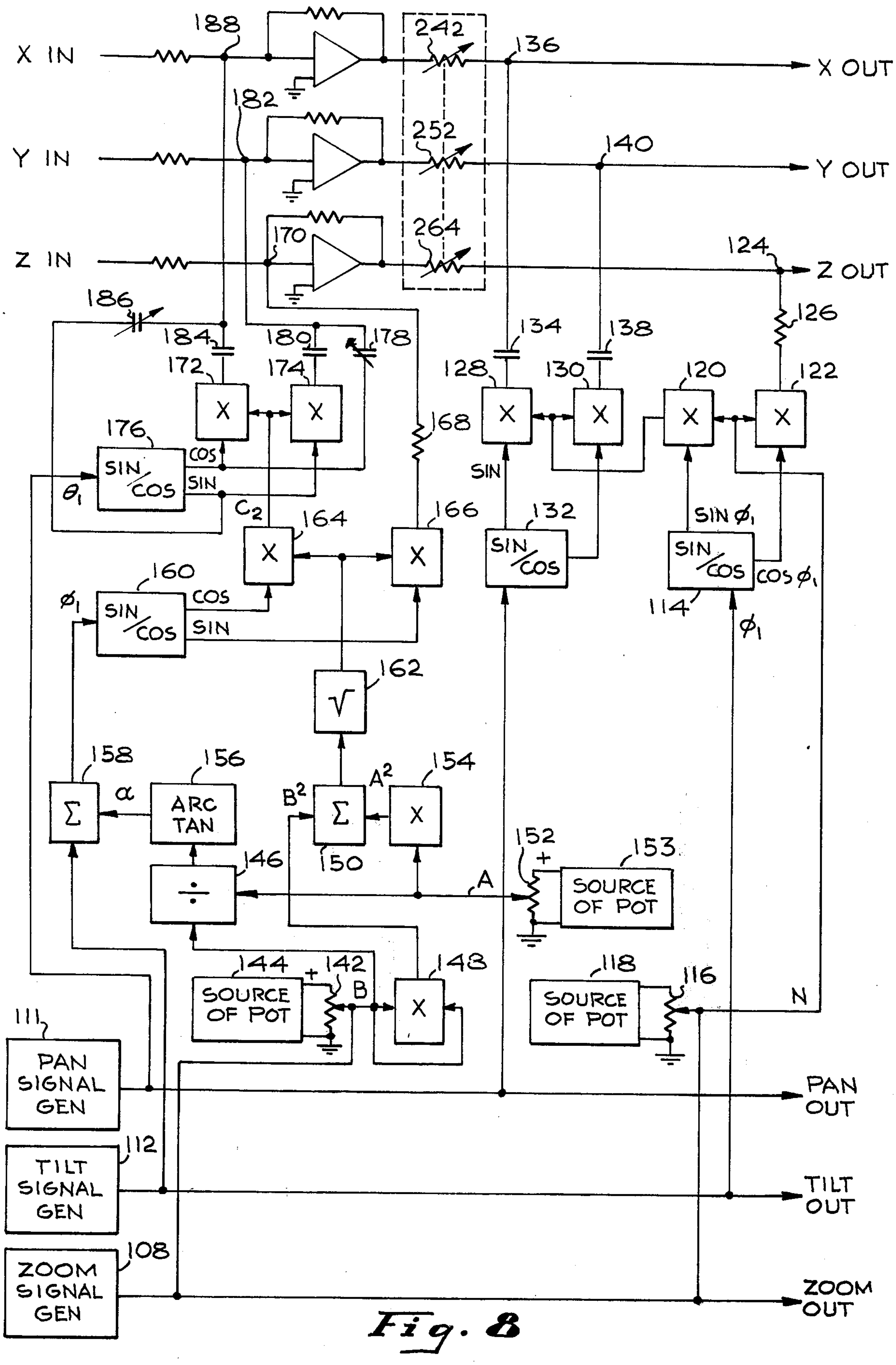
FIG. 8 is a block schematic drawing of the correctional circuits required, in accordance with this invention, to generate to required correctional signals for correcting for pivotal to nodal point displacements of foreground and background cameras.

Referring now to FIG. 8, there may be seen a block schematic diagram of an embodiment of the invention, which effectively comprises a circuit for generating electrical signals analagous to the equations which have been described. It was previously stated that in the application by Trumbull et al, potentiometers were connected to the FG camera so that a panning motion of the camera would generate pan representative signals, a tilting motion of the camera would generate tilt representative signals. In FIG. 5, there is shown a potentiometer 108, which is capable of generating zoom signals indicative of motion of the lens of the camera which departs from a "normal" lens position. In FIG. 8, the term "pan signal generator," 111 represents the potentiometer on the FG camera which provides pan representative signals. The "tilt signal generator" 112 represents the potentiometer on the FG camera which provides the total tilt angle representative signals. The zoom function generator 108, represents the structure shown in FIG. 5 which provides the zoom node location signal.

The output of the tilt signal generator 112 is applied to a Sin/Cos circuit 114. The Sin/Cos circuit is a well known electrical function generator which is commercially purchasable. It provides two electrical signal outputs, in response to an input, one representing the Sine of the input and the other the cosine of the input. The outputs of the sine/cosine generator 104 will therefore be respectively the sine and the cosine of the total tilt angle. The tilt signal generator output may be represented by $\phi_1$ and therefore the respective outputs from the sine/cosine generator 114 are respectively Sin $\phi_1$ and Cos $\phi_1$.

The distance N in the BG camera, when the lens is at its normal location is fixed and a signal representative thereof may be derived by connecting a potentiometer 116 across a source of potential 118. The output of the zoom node location signal generator 108, in the event the FG camera lens is zoomed, is added to or subtracted from the N signal derived from the potentiometer 106. The N signal is applied as one input to the respective multiplier circuits 120, 122. Another input to the multiplier circuit 120 is the signal representative of sin $\phi_1$. Another input to the multiplier 122 is the signal representative of Cos $\phi_1$. The output of the multiplier 122 represents the distance Z which is to be added to any Z signal which is being received from the FG camera. The output of the multiplier 122 is applied to a terminal 124 through a resistor 126.

The output of the multiplier 120, N Sin $\phi_1 = C_1$, is applied to two multipliers respectively 128, 130. The output of the pan signal generator 111 is a signal representative of the angle $\theta_1$. It is applied to a sine/cosine circuit 132. The sine output of this circuit is applied to multiplier 128 which provides the output $C_1$ Sin $\theta_1 = Y$. This output is differentiated by passing it through a capacitor 134 which provides as output a current which is Y rate representative signal. The output of the capacitor 134 is applied to a terminal 136. The cosine output of the sine/cosine circuit 132 is applied as a second input to the multiplier 130. Its output accordingly will be $X = C_1$ Cos $\theta_1$. This output is differentiated by applying it to a capacitor 138. The output of the capacitor is an X rate representative signal which is applied to a terminal 140.

Terminals 124, 140 and 136 respectively connected to the Z, Y and X lines which receive Z, Y and X signals from the FG camera and apply them to the BG camera motor drives.

A potentiometer 142 is connected across a source of potential 144. The potentiometer arm is positioned to provide, as an output, a signal representing the distance B. The B signal, just like the N signal, may be modified by the output of the zoom signal generator 108, if the camera lens on the FG camera is zoomed. The B representative signal is applied to a dividing circuit 146 and to a squaring circuit 148. The squaring circuit provides an output $B^2$ to a summing circuit 150. A potentiometer 152, which is connected across a source of potential 153, has its moveable arm positioned at a location at which the output will be a signal representative of the distance A on the FG camera. This A signal is applied as one input to a squaring circuit 154 and as a second input to the dividing circuit 146. The dividing circuit 146 provides, as its output, a signal representative of A/B. This signal is applied to an arc tan circuit 156, whose output will then be a signal representative of the angle $\alpha$. An arc tan circuit is a commercially purchasable function generator. The output of the arc tan circuit is applied to a summing circuit 158, whose other input is the tilt angle from the tilt signal generator. As a result, the output of the summing circuit 158 is a signal representative of the angle $\phi_1$. This is applied to another sine/cosine generator 160.

The output of the squaring circuit 154 is applied as a second input to the summing circuit 150, with the result that the output of the summing circuit 140 comprises $A^2 + B^2$. This is applied to a square root function generating circuit 162. The output of the square root function generating circuit is then equal to $\sqrt{A^2 + B^2}$. The $\sqrt{A^2 + B^2}$ signal is applied to two multipliers respectively 164 and 165.

The cosine $\phi_1$ representative signal output from the sine/cosine generator 160 is applied as a second input to the multiplier 164. The sine $\phi_1$ output of the sine/cosine generator 160 is applied as a second input to the multiplier 166. The output of the multiplier 166 will then be a signal representative of the Z compensation required to be used. It is applied through a resistor 168 to a terminal 170.

The output of the multiplier 164 comprises a signal representative of the quantity $C_1$, which is applied as an input to two multipliers respectively 172 and 174. The pan angle representative signal $\theta_1$ is derived from the output of the pan signal generator 111. This is applied to a sine/cosine generator 176. The cosine output of this generator is applied at the second input to the amultiplier 172. The sine output of this generator is applied as the second input to the multiplier 174. The output of the multiplier 174 is a signal representative of $C_2$ Sin $\theta_1 = Y$. This signal is differentiated to provide a Y rate signal and is then added or subtracted, as may be required, from a "side wise" offset correction signal. This is a signal which is derived from the cosine output of the generator 176 to compensate for the possibility that the optical axis of the FG camera may be to the right, for example, of the pivotal axis. This correction signal is derived using a capacitor 178. The output of the multiplier 174 is differentiated by the capacitor 180 and is added to the output of the capacitor 178, and then brought to a terminal 182.

The output of the multiplier 172 is $C_2$ Cos $\theta_1 = X$ and it is differentiated by a capacitor 174 to provide a rate X signal. The output from this capacitor is added to a correctional signal output again, which is used in the event that the optical axis of the camera is displaced to the left of the pivotal axis. The correctional signal is derived from the output of a capacitor 176, which is in response to the sine output of the sine/cosine generator 186. Thetwo signals The two added at a junction and are then connected to the terminal 188. The terminals 188, 182 and 170 are connected to add the correctional X, Y and Z singals to X, Y and Z signals received from the FG camera. These signals are then attenuated by potentiometers 242, 252 and 264, and are then added to the BG camera X, Y and Z correctional signals. These are thereafter applied to the BG camera as will be seen in FIG. 11.

Figure 9:
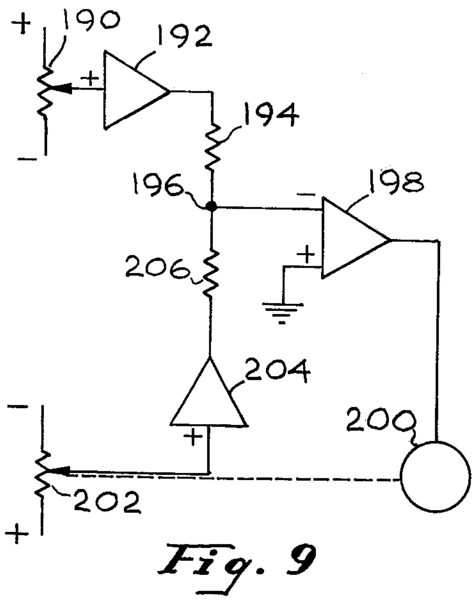
FIG. 9 is a circuit diagram illustrating the foreground camera pan signal generating dircuit and the background camera response circuit.

FIG. 9 shows the details of the circuitry for the pan siganl generator. It comprises a potentiometer 190, connected across a positive and negative source of potential whose arm is mechanically connected to the FG camera to move therewith as it is moved in a panning direction. The output signal, representative of the pan angle $\theta_1$ is applied to an amplifier 192, whose output is connected through a resistor 194, to a junction 196. The junction is connected as one input to a differential amplifier 198, whose other input is grounded. The output of the differential amplifier is connected as one input to a differential amplifier 198, whose other input is grounded. The output of the differential amplifier is connected to a servo motor 200. This motor rotates the BG camera 60 to an angle specified by the output of potentiometer 190. The motor 200 is also coupled to move the arm of another potentiometer 202 through a distance representing the same angle as it is rotated. Potentiometer 202 is connected across a positive and negative source of potential, and the resulting signal on the potentiometer arm is applied to an amplifier 204. Amplifier 204 output is applied through resistor 206, to the junction 196, to oppose the signal received from the potentiometer 190.

Figure 10:
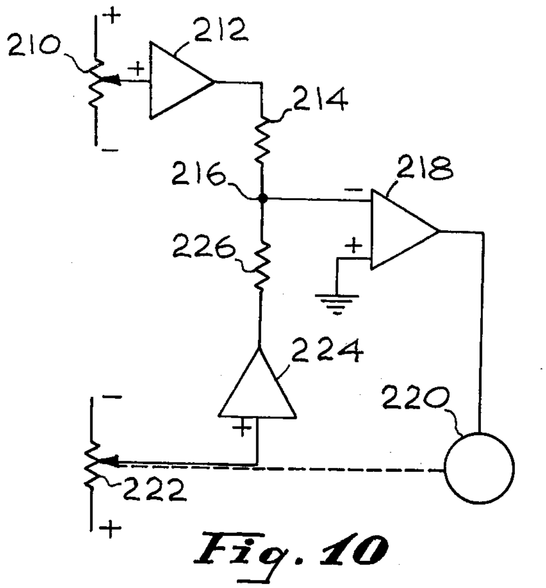
FIG. 10 is a circuit diagram illustrating the foreground camera tilt signal generating circuits and the background camera response circuit.

The tilt signal arrangement is similar, and is shown in FIG. 10. A potentiometer 210 is connected across a positive and negative potential source. The potentiometer arm is moved in response to the tilt motion of the FG camera and provides an output signal representative of the tilt angle, which is added to the arc tan A/B to produce the angle $\phi_1$. The tilt angle representative output signal is applied to amplifier 212. The amplifier 212 output is connected through a resistor 214 to a junction 216. The junction is connected as one input to a differential amplifier 218, whose other input is grounded. The output of the differential amplifier is applied to a motor 220 to drive it through an angle specified by the output signal from the potentiometer 210. The motor 220 is also mechanically coupled to the arm of the potentiometer 222 to drive it through a corresponding angle. The potentiometer 222 is connected across a positive and negative source of potential and its output represents the response of the motor, and therefore of the BG camera, to the tilt signal. The output signal on the potentiometer 222 arm is applied to an amplifier 224, whose output is connected through a resistor 226 to the junction 216 to oppose the signal received from the potentiometer 210.

Figure 11:
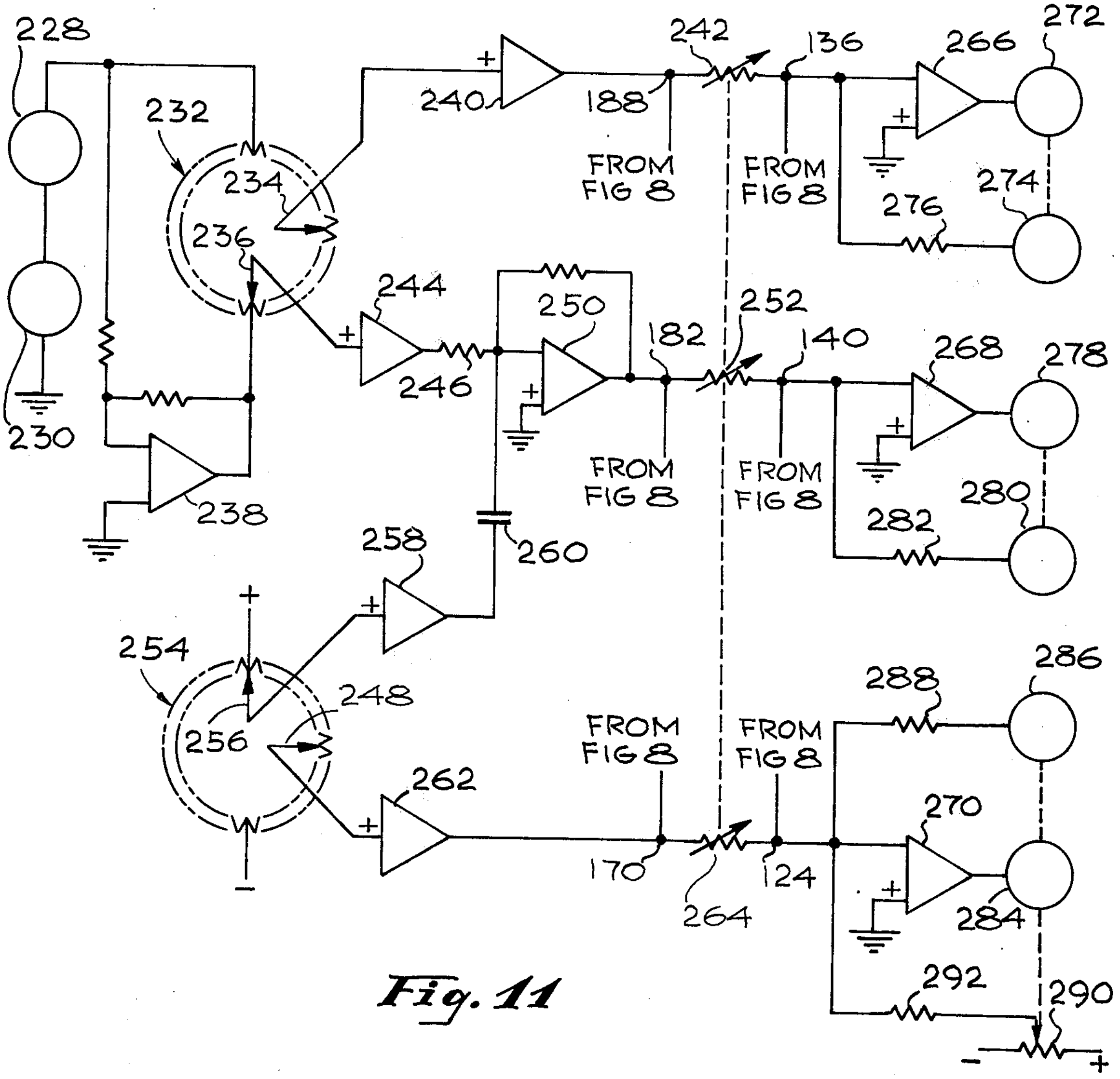
FIG. 11 is a schematic diagram illustrating X, Y and Z signal generating circuits of the foreground camera and the background camera response circuits.

FIG. 11 represents the electrical circuit for providing X, Y and Z signals to the BG camera from the FG camera. As described more fully in the Trumbull et al application, the front of the dolly carrying the FG camera has two sets of two wheels and one of the tachometers 228, is connected to be rotated by one of the two wheels in a set and the other tachometer 230 is connected to be rotated by the other of the two wheels of a set. Thus, if the dolly stands still and the front wheels are merely turned so that the two wheels of a set rotate in opposition to one another, the tachometers are electrically connected in opposition so that their outputs will cancel. If however the dolly is moved from its location, the tachometer outputs will not cancel but are added and applied across a sine/cosine potentiometer 232. The arms 234, 236 of the potentiometer 232 move in response to the deviation of the wheel assemblies from straight ahead. In other words they will move in response to the steering motion of the dolly. A signal equal in magnitude to the net output signal of the tachometers but of opposite polarity is produced by an operational amplifier 238, to which the output of the series connected tachometers is also applied. Operational amplifier 238 output is connected to a tap on the resistor of the sine/cosine potentiometer 232 which is opposite to the one to which the series connected tachometer output is connected.

The sine wiper 234 of the potentiometer is connected through a buffer amplifier 240, to an attenuator potentiometer 242. The terminal 188, which is the means for delivering the FG camera X-rate correctional signal is also connected to the attenuator potentiometer 242.

The cosine wiper 236 of the potentiometer 232 applies its output signal to a buffer amplifier 244. The buffer amplifier output is fed through a resistor 246 to an operational amplifier 250. The output of the operational amplifier 250 is connected to a second attenuating potentiometer 252. Also connected to the second attenuating potentiometer 252 is the terminal 182, which is the means for applying the Y correctional signal from the FG camera.

Because angular movement of the boom 45 around its horizontal axis produces changes in FG camera location in both Y and Z directions, means are provided for combining a function of that angular movement with the basic Y rate signal from cosine wiper 236 to provide a control signal to be fed to the Y drive motor for the BG camera. Thus, boom angular movement is measured by a sine/cosine potentiometer 254, whose cosine wiper 256, produces a signal which is fed through buffer amplifier 258, to a capacitor 260. The capacitor 260 is connected to the input of operational amplifier 250 and is there summed with the Y signal from the cosine wiper 226.

The sine wiper 258, of potentiometer 254, produces a Z output signal which is applied to an amplifier 262. The output of this amplifier is fed to attenuating potentiometer 264. Also connected to the attenuating potentiometer is the terminal 170 which provides the Z correctional signal.

The three potentiometers 242, 252, and 264, are set to attenuate the X, Y and Z signals received from the FG camera by a scale factor determined by the scale factor or ratio of actor to background required for a particular production. The outputs from the respective attenuating potentiometers 242, 252, and 264, are respectively applied to differential amplifiers respectively 266, 268, and 270. Also connected to the input of the amplifier 266 is the terminal 136 which provides the X rate correctional signal from the BG camera. Also connected to the input to amplifier 268 is terminal 140 which provides the Z correctional signal for the BG camera. Amplifier 266 drives a motor 272 which moves the BG camera in the X direction. Morot 272 also drives a tachometer 274, whose output is coupled through a resistor 276 to the input of the error amplifier 266 to be summed with the input.

A BG camera Y drive motor 278 responds to the output of the amplifier 268. The Y drive motor drives a tachometer 280 whose output is returned to the input of amplifier 268 through a resistor 272 to be summed with the input to the amplifier.

The amplifier 270 drives a motor 284, which causes movement of the BG camera in the vertical or Z direction. The motor also drives a tachometer 286 whose output is fed back to the input of the amplifier 270 through a resistor 288. A potentiometer 290, connected across a positive and negative potential supply, has its shaft moved in response to Z direction movement of the motor 292. The potential pvoided at the arm of potentiometer 290 is fed back to the input of amplifier 270 through a resistor 292 to be added to said amplifier input.

it should be noted that FIGS.. 9, 10 and 11 are identical with the FIGS. 22, 23 and 24 in the aforesaid application of Trumbull, et al, with the only addition being the illustration in FIG. 11 of the connection of terminals shown in FIG. 8, which provide the BG and FG correctional signals.

There has accordingly been shown and described a novel, useful arrangement for correcting the movement of a background camera for motion of the foreground camera to the motion of which it is slaved, to compensate for the differences between the locations of the pivotal points of both background and foreground cameras and their nodal points. Those skilled in the art will appreciate that if either FG on BG camera is mounted so that it actually pivots about its nodal point then correctional signals need only be generated, in the manner taught herein, for the camera which does not pivot about its nodal point.

The embodiments of the invention in which an exclusive property or privilege is claimed are defined as follows:

1. In a compsite photography system of the registered matte type having foreground and background cameras and objects constituting a reference frame for each camera in a scene in the field of view of each camera, the size of objects in the background scene being on a scale substantially different from that of objects in the foreground scene, mounting means supporting each camera for movement about a pivotal point whereby a change in the perspective of each scene may be viewed by its respective camera, the nodal points of the foreground camera and of the background camera being respectively displaced by predetermined distances from their pivotal points, and the cameras being coupled for synchronizing the movement of the background camera with movement along X, Y, and Z-axes and pan and tilt of the foreground camera means for maintaining the perspective with which the background camera views its scene synchronized with the perspective with which the foreground camera views its scene during pan and tilt movements of the foreground camera comprising means at said foreground camera for generating pan and tilt signals, respectively representative of pan and tilt motion thereof, means responsive to said signals representative of foreground camera pan and tilt motion for generating first correctional signals representative of the displacement of the nodal point of said background camera from its pivotal point in response to said foreground camera pan and tilt signals, means responsive to said foreground camera pan and tilt signals for generating second correctional signals representative of the displacement of said foreground camera nodal point from its pivotal point in response to said foreground camera pan and tilt motion, means for scaling said second correctional signals in accordance with a predetermined scaling factor, means for adding said first and second scaled correctional signals to produce resulting correctional signals, and means responsive to said resulting correctional signals for moving the nodal point of said background camera to a nodal point location which, relative to the scene being viewed by said background camera, is identical with the nodal point location of the foreground camera relative to the scene being viewed by said foreground camera.

2. An apparatus as recited in claim 1 wherein said means for generating first correctional signals includes means for generating an N signal representative of the distance between the nodal and pivotal points of said background camera, a cosine $\phi_1$ signal reprsentative of a cosine of the tilt angle to which said background camera is to be driven in response to the tilt of the foreground camera, a sine $\phi_1$ signal representative of the sine of said tilt angle, a cosine $\theta_1$ signal representative of the cosine of the pan angle to which said background camera is to be driven in response to the panning of said foreground camera, and a sine $\phi_1$ signal representative of the sine of the pan angle, means for multiplying said N signal by said cosine $\phi_1$ signal to provide a C signal, means for multipying said C signal by said cosine $\theta_1$ signal to produce an X-axis rate signal, means for differentiating said first resultant signal, means for multiplying said C signal by said sine $\phi_1$ signal to produce a second resultant signal, means for differentiating said second resultant signal to produce a Y-axis rate signal, means for multiplying said N signal by said sine $\phi_1$ signal to produce a Z-axis correctional signal.

3. In a system as recited in claim 1 wherein said means for generating second correctional signals comprise means for generating a square root signal representative of the distance between said foreground camera pivotal point and nodal point, a cosine $\phi_1$ signal, representative of a cosine of the tilt angle of said foreground camera, a sine $\phi_1$ signal representative of the sine of the tilt angle of said foreground camera, a cosine $\theta_1$ signal representative of the cosine of the pan angle of said foreground camera, and a sine $\theta_1$ signal representative of the sine of the pan angle of said foreground camera, means for multiplying said square root signal with said cosine $\phi_1$ signal to produce a $C_2$ signal, means for multiplying said $C_2$ signal with said cosine $\theta_1$ signal to produce an X-axis resultant signal, means for differentiating said X resultant signal to produce an X-axis corrective rate signal, means for multiplying said sine $\theta_1$ signal with said $C_2$ signal to produce a Y-axis corrective signal, means for differentiating said Y corrective signal to produce a Y-axis corrective rate signal, means for multiplying said square root signal by said sine $\theta_1$ signal to produce a Z-axis corrective signal.

4. In a composite photography system of the registered matte type having foreground and background cameras and objects constituting a reference frame for each camera in a scene in the field of view of each camera, the size of the objects in the background scene being on a scale substantially different from that of objects in the foreground scene camera both cameras being supported for three dimensional movement and movement in pan and tilt, said foreground camera having means for generating X, Y and Z, pan and tilt signals, there being means for scaling said X, Y and Z signals, said background camera having means for responding to said scaled X, Y and Z signals and said pan and tilt signals for maintaining said background camera motion synchronized with said foreground camera, the improvement comprising means for correcting the background camera movement for displacement of the model and pivotal points of said foreground camera and for displacement of the nodal and pivotal points of said background camera comprising means for compensating for the displacement of the nodal points of said foreground and background cameras from their pivotal points comprising means for generating an N signal representative of the distance between the nodal point and pivotal point of said background camera, means responsive to said N signal and the pan and tilt signals of said foreground camera for generating first X, Y and Z corrective signals, means for generating a square root signal representative of the distance between the nodal points and the pivotal point of said foreground camera, means responsive to said square root signal and the pan and tilt movements of said foreground camera for generating second X, Y, and Z corrective signals, means for applying said second X, Y and Z corrective signals to said scaling means to be corrected for the difference in scale between said foregoing and background scenes, and means for applying said X, Y and Z scaled corrective signals and said first X, Y and Z corrective signals to said background camera to move it in response thereto whereby said background camera is positioned at a location which compensates for the distance between the pivotal and nodal points of both foreground and background cameras.

5. In a composite photography system of the registered matte type having foreground and background cameras and objects constituting a reference frame for each camera in a scene in the field of view of each camera, the size of objects in the background scene going on a scale substantially different from that of objects in the foreground scene, mounting mans supporting each camera for movement about a pivotal axis whereby to change the perspective of each scene is viewed by its respective camera, the nodal point of the foreground camera and of the background camera being respectively displaced by a predetermined distance from their pivotal axes, said foreground camera generating signals representative of pan and tilt motion, and the cameras being coupled for synchronizing the movement of the background camera with movement along X, Y and Z-axes and pan and tilt of the foreground camera means for compensating for the displacement of the nodal point from the pivotal point of said background camera comprising means for generating a first distance signal representative of the distance between said background camera nodal and pivotal points, means responsive to pan and tilt signals generated by said foreground camera and to said distance signal for generating X, Y and Z-axis corrective signals indicative of the location to which said background camera nodal point must be moved in response to said foreground camera pan and tilt signals, to eliminate any error caused by the displacement of its nodal point from its pivotal point, and means for moving said background camera along its X, Y and Z axes in response to said X, Y and Z corrective signals.

6. In a composite photography system of the registered matte type having foreground and background cameras and objects constituting a reference frame for each camera in a scene in the field of view of each camera, the size of objects in the background scene going on a scale substantially different from that of objects in the foreground scene, mounting means supporting each camera for movement about a pivotal axis whereby to change the perspective of each scene is viewed by its respective camera, the nodal point of the foreground camera and of the background camera being respectively displaced by a predetermined distance from their pivotal axes, said foreground camera generating signals representative of pan and tilt motion, and the cameras being coupled for synchronizing the movement of the background camera with movement along X, Y and Z axes and pan and tilt of the foreground camera means for compensating the background camera viewing perspective for the displacement of the nodal point from the pivotal point of said foreground camera comprising means for generating a square root signal representative of the distance between said pivotal and nodal points of said foreground camera, means responsive to said tilt angle signal to generate a signal representative of the sine of said tilt angle and another signal representative of the cosine of said tilt angle, means for multiplying said square root signal by said sine of said tilt angle signal to obtain a Z-axis corrective signal, means for multiplying said square root signal by said cosine of said tilt angle signal to obtain a C signal representative of the radius of a circle described by said nodal point when said foreground camera is panned, means responsive to said tilt angle signal for generating a signal representative of the sine of said tilt angle and for generating a signal representative of the cosine of said tilt angle, means for multiplying said C signal by said sine of said tilt angle signal to obtain a Y-axis corrective signal, means for multiplying said C signal by said cosine of said tilt angle signal to obtain an X axis corrective signal, means for differentiating said X and Y-axis corrective signals in accordance with the ratio of objects in said foreground and background scenes, and means for moving said background camera in response to said attenuated X and Y axis correctional signals and said Z axis correctional signals.

* * * * *